United States Patent Office 3,560,451
Patented Feb. 2, 1971

---

3,560,451
PLASTIC AND NONFLAMMABLE SULFUR COMPOSITION
Jean-Baptiste Signouret, Billiere, France, assignor to Societe Nationale des Petroles d'Aquitaine, Tour Aquitaine, Courbevoie, France, a corporation of France
No Drawing. Filed Feb. 12, 1968, Ser. No. 704,553
Claims priority, application France, Feb. 17, 1967, 95,305
Int. Cl. C08g 33/00
U.S. Cl. 260—79
7 Claims

ABSTRACT OF THE DISCLOSURE

A nonflammable plastic composition is obtained by melting together sulfur with three compounds which are: (1) a dithiophosphoric acid ester acrylic hydrocarbyls, (2) a vinyl-aryl hydrocarbon and (3) a polythiomethylene-alkanol resin, The three compounds are mixed with the molten sulfur separately or jointly, except that the ester (1) and the resin (3) are never added at the same time, and the moments of their addition are separated by a period of heating the mixture at 120° to 180° C.

---

The invention relates to an improved plastic sulfur composition and also to a process for the manufacture of this product. It is concerned more especially with a non-flammable composition, which is very pliable and adherent to various constructional materials.

A plastic sulfur composition, in which the plasticization effect is obtained by the addition of a polythiomethylene alkanol, has previously been described by the applicants, particularly in U.S. Pat. No. 3,352,837; the applicants have moreover found that excellent nonflammable plastic compositions could be obtained by heating sulfur with a diester of dithiophosphoric acid and an ethylenic hydrocarbon, as indicated in copending U.S. Pat. application S.N. 649,045, now Pat. No. 3,459,717 for "New Plastic Sulfur Composition." In the continuation of their research, the applicants have obtained improved results by the three aforementioned types of adjuvants being jointly added to the sulfur, that is to say, by adding together a dithiophosphoric diester, a vinyl alkene and a resin of polythiomethylene alkanol; in this way, more flexible plastic materials are obtained, which have supplementary advantages in certain uses; for example, the tendency of these materials to flake off is less than that of the previously described compositions, and this enables even more durable coatings to be obtained. However, the combination of the aforementioned adjuvants is only able to lead to good results under certain particular conditions, which form the subject of the new process according to the present invention.

The new process consists in incorporating a polythiomethylene alkanol, a vinyl alkene and an aromatic diester of dithiophosphoric acid into molten sulphur, and in heating the product which has formed until a plastic composition is obtained, the moment of adding the polythiomethylene alkanol being separated from the moment of adding the diester by a certain period of heating between 120° and 180° C.

The study of this question has actually led to the discovery that it was not expedient to have the polythiomethylene alkanol present with fresh dithiophosphoric diester within the composition, because then the alkanol is polymerised instead of plasticizing the sulfur; experience has shown that one of these two adjuvants must have previously reacted with the sulfur before the addition of the second. As a result, in carrying out the new process, the polythiomethylene alkanol and the dithiophosphoric diester are never introduced simultaneously into the molten sulfur, although various sequences in the introduction of the adjuvants are possible.

With the object of simplification, A represents the polythiomethylene alkanol, B the aryl alkene, and C the dithiophosphoric diester in the following description.

Each of these constituents A, B and C can be introduced separately into the sulfur, and any succession can be used as regards these introductions, particularly: A–B–C, B–A–C, C–B–A, B–C–A, C–A–B, A–C–B, etc. On the other hand, two adjuvants can be introduced simultaneously, except A+C; it is thus possible to proceed with the successive additions of :A, followed after a heating period by (B+C), or even (B+C), followed after heating by A; or even (A+B), followed after heating by C. In general terms, each addition of adjuvant must be followed by a heating period.

According to a preferred feature of the invention, the temperature and the heating periods succeeding the addition of each of the aforementioned additives are:

A: 140° C. to 160° C. for 30 minutes to 2 hours,
B: 120° C. to 160° C. for 30 minutes to 2 hours,
C: 130° C. to 180° C. for 30 minutes to 2 hours.

Least colored plastic compositions are obtained when the first adjuvant is C, the second is B and the third is A, each of the intermediate heating periods lasting about 1 hour at the preferred temperatures, which are respectively 150–160° C., 140–150° C. and 140–150° C.

In general, the products obtained by these different working methods have the same properties as regards plasticity, non-flammability and adherence to different constructional materials. Moreover, the additives can be added in one or several batches, or even continuously. It is also possible to operate by a plasticized composition with a higher content of additives being diluted in the molten sulphur at about 120–160° C.

One important condition for achieving the invention is that the dithiophosphoric diester

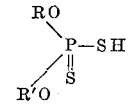

being used is aromatic, that is to say, the radicals R and R', which are identical or different, are aryl radicals. It is thus possible with advantage to use the diesters of dithiophosphoric acid, of which the radicals R and R', optionally identical, are phenyls, monohalophenyls or polyhalophenyls, tolyls, monohalotolyls or polyhalotolyls, particularly chlorinated tolyls, xylyls, monochloroxylyls or polychloroxylyls, benzyls, chlorobenzyls or bromobenzyls, optionally halogenated and/or alkylated naphthyls, diphenyls, chlorodiphenyls, etc.

The aryl alkene used according to the invention is preferably a vinyl aryl, of which the most usual example is styrene; however, other vinyl aryls with one or more benzene rings can be used, when it is desired to modify to a greater or lesser degree the properties of the plastic sulfur composition. Compounds such as for example α-methylstyrene, α-chlorostyrene, dimethylstyrene, ethylstyrene, fluorostyrene, etc., are suitable.

As polythiomethylene alkanol, it is possible with advantage to use a resin which is formed, as described particularly in the U.S. Pat. 3,352,837, by the simultaneous reaction of a haloepoxyalkane and hydrogen sulphide on an aqueous solution of a polysulphide of alkali or alkaline-earth metal. The haloepoxyalkane can, for example, be 1-chloro-5,6-epoxyhexane;
2-chloro-5,6-epoxyhexane;
1-chloro-4,5-epoxypentane;

1-chloro-3,4-epoxybutane;
2-bromo-3,4-epoxybutane;
1-chloro-2,4-epoxybutane;
1-chloro-2,3-epoxypropane, etc., it moreover being possible for the position of the halogen to be different from that indicated in these examples. The last of the compounds mentioned above, known under the name of epichlorhydrin, is a very familiar chemical product which is economically available in large quantities. It is therefore of particular practical value for the invention. Thus, the polythiomethylene alkanol highly recommended as additive within the scope of the new process is that which is obtained by the condensation of 1.5 to 2 mols of epichlorhydrin and at least 1 mol. of $H_2S$ with 1 mol. of alkali or alkaline-earth polysulphide in aqueous solution, at a temperature which is between ambient temperature and 100° C.

Particularly suitable, for carrying out the invention, are resinous polythiomethylene alkanols having the $$H(SCH_2—CHOH—CH_2S)_pH$$

in which $p$ is a number the mean value of which is from 4 to 24, the resinous product having a molar weight of 500 to 3,000, being soluble in molten sulfur in a proportion of at least 15% by weight at a temperature of about 150° C., melting below 100° C. and having a sulfur content of 40% to 55% by weight.

The relative proportions of the constituents according to the invention can vary within wide limits, but the products of greatest industrial interest are obtained in the limits by weight of 30 to 97 parts for the sulfur, 20 parts to 1 part for the dithiophosphoric diester, 20 parts to 1 part for the polythiomethylene alkanol resin and 30 parts to 1 part for the vinyl alkene. The best results are obtained with 70 to 90 parts of sulfur, 1 to 15 parts of polythiomethylene alkanol, the remainder being dithiophosphoric diester and vinyl aryl; the ratio by weight between the diester and the vinyl aryl is then from 0.2 to 5 and preferably from 0.5 to 2.

The plastic compositions according to the invention have numerous applications; they can particularly be employed as paving or walling materials and can be colored with the aid of appropriate dyes and/or pigments, possibly in a very light or white tint.

One important application is the laying of route-marking strips for bituminous or concrete surfaces; the new materials adhere very strongly to these surfaces and do not show any flaking after two years. For this use, it is possible to employ them alone or with balls of special glass which increase the reflecting power. When applying the strips, the latter can be powdered with small balls of synthetic material or natural or synthetic rubber, which improves still further the rolling properties and the coefficient of friction. The new plastic sulfur compositions can also be used as floor coverings, as such, or filled with sand and/or gravel. The resistance to shock of the coatings or other objects made with the new compositions can be improved by the addition of glass and/or asbestos fibres.

In general, the plastic compositions according to the present invention have the various qualities of the plastic compositions described in the documents mentioned above, but enjoy a greater plasticity. They are practically completely non-flammable. On the other hand, they are water-repellent and resist organic solvents and also mineral acids.

The following examples are intended to illustrate the invention, but these do not have any limiting character. In these examples, the following abbreviations are used:

A: polythiomethylene alkanol resin, described in Example 1 of French Pat. 1,425,283, B: styrene, C: diphenyl dithiophosphate (i.e. R and R' of the formula given above are phenyls).

EXAMPLES 1 TO 8

To 85 kg. of liquid sulfur, there are added 5 kg. of each of the adjuvants A, B and C and, after each addition, the material is heated for 1 hour at the following temperatures:

140 to 150° C. after adding A
135 to 145° C. after adding B
140 to 160° C. after adding C The succession of these additions varied from one example to the other, as indicated below:

|  | 1st | | 2nd | | 3rd | |
|---|---|---|---|---|---|---|
|  | Addition | Heating, hour | Addition | Heating, hour | Addition | Heating, hour |
| Example Number: | | | | | | |
| 1 | A | 1 | B | 1 | C | 1 |
| 2 | A | 1 | B+C | 1 | | |
| 3 | B+C | 1 | A | 1 | | |
| 4 | A+B | 1 | C | 1 | | |
| 5 | B | 1 | A | 1 | C | 1 |
| 6 | B | 1 | C | 1 | A | 1 |
| 7 | C | 1 | B | 1 | A | 1 |
| 8 | C | 1 | A | 1 | B | 1 |

In all cases, plastic materials of excellent quality are obtained, these being very adherent to constructional materials and being nonflammable.

The product lightest in color is that in Example 7, that is to say, where the sequence is C–B–A.

Spread in layers of 1 mm., at ambient temperature, these products are dry after 30 minutes.

EXAMPLES 9 to 16

Instead of 5 kg. of each of the adjuvants of Examples 1 to 8, the quantities employed are:

Kg.
A ------------------------------------------- 2.5
B ------------------------------------------- 7.5
C ------------------------------------------- 5.0

In each Example 9 to 16, the sequence of operations is the same as in Examples 1 to 8, respectively. The compositions obtained are homogeneous, adhere strongly to constructional materials and remain nonflammable.

The product prepared according to the sequence C–B–A is the lightest in color.

In 20 minutes, a layer with a thickness of 1 mm. is dry.

EXAMPLES 17 to 24

A sequence of preparations which are respectively similar to those of Examples 1 to 8 is obtained with:

Kg.
A ------------------------------------------- 5
B ------------------------------------------- 10
C ------------------------------------------- 10 for 75 kg. of sulfur.

The compositions obtained are very plastic, very adherent and nonflammable.

EXAMPLE 25

Each of the products obtained according to Examples 1 to 16 is remelted, with addition of 1.75% by weight of cadmium yellow, which is intimately dispersed in the composition. The liquid composition is then applied by spraying, using a spray piston machine, in the form of marking strips or lines on a bitumen road surface; an identical application is carried out on a concreted area.

In all cases, a very good adhesiveness and a good resistance to wear caused by the pneumatic tires of vehicles running on the test surfaces are found. The results are the same for sixteen products.

EXAMPLE 26

The plastic composition obtained according to the sequence C, B, A, with the proportions: A (2.5%)–B (7.5%)–C (5%), has mixed therewith, at 130° C., 25% by weight of TiO₂ in powder form, especially for paint, using a paint grinding mill with an agitator turning at 2000 r.p.m. 0.5% by weight of a reddish-violet mineral pigmemnt is then dispersed and, after dispersion, pouring and cooling, a light-colored paint is obtained which, after 24 hours, has a reflection of 60% with respect to the standard (BaSO₄). The paint as thus obtained can be used by being sprayed hot as a white road paint on bitumen or concrete. The resistance to bad weather influences and to abrasion is very good.

EXAMPLE 27

The compositions of Examples 1 to 16 are each filled between 130° and 140°, with 10% of glass fibres; the coating materials thus prepared are applied hot to concrete and brick walls. In all case, the adhesiveness with the walls is very good.

The coatings are nonflammable and resistant to weather influences, and also to the action of sulfur dioxide.

The shock resistance is increased by the glass fibre filling.

EXAMPLE 28

Each of the compositions of Examples 1 to 24 is mixed at about 140° C. with 80 kg. of dry sand and 320 kg. of dry coarse gravel, of assorted sizes as for concrete, to 100 kg. of plastic composition. The mixture obtained is poured partly on to a floor, and partly into shutterings reinforced with iron rods. Compositions are obtained which are very resistant to shocks, solvents, fuels and water; these compositions do not ignite, even in contact with an ignited petrol. The reinforced compositions adhere very strongly to the iron reinforcement, they do not permit passage either of water or conventional organic solvents, or of mineral acids or liquid fuels.

In the foregoing, the nonflammability of the sulfur compositions was checked by a standard test, carried out according to standard ASTM–D 635–63. This test consists in exposing a fragment of plasticised sulfur to the action of a gas burner flame; the samples of sulfur, plasticised according to the invention, melted and flowed without burning, and there was no liberation of sulfur dioxide.

I claim:

1. Process for preparing a high sulfur content plastic nonflammable composition, which comprises melting together at a temperature of 120° to 180° C. 30 to 97 parts by weight of sulfur with 20 to 1 parts of a dithiophosphoric acid diester containing aryl radicals each having 6 to 10 carbon atoms, 30 to 1 part of a vinyl-aryl hydrocarbon having 8 to 12 carbon atoms, and 20 to 1 parts of a polythiomethylene-alkanol resin resulting from the condensation of 1.5 to 2 moles of a halo-epoxy-alkane having 3 to 6 carbon atoms, with 1 mole of alkali metal polysulfide and at least 1 mole of hydrogen sulfide, the addition of the three adjuvants being stepwise wherein up to two of the three adjuvants are added simultaneously to the molten sulfur while excluding the simultaneous addition of polytthiomethylene alkanol and dithiophosphoric diester, and wherein each addition of adjuvant is followed by a heating period of ½ to 2 hours at a temperature of 120° to 180° C.

2. Process according to claim 1, wherein said dithiophosphoric acid diester is selected from the group consisting of diphenyl - dithiophosphate, ditolyl - dithiophosphate and dixylyl - dithiophosphate, the vinyl-aryl hydrocarbon is selected from the group consisting of styrene, alpha - methyl - styrene, alpha - chloro-styrene, dimethylstyrene and ethyl-styrene, while the halo-epoxy-alkane is selected from the group consisting of 1 - chloro - 2,3-epoxy - propane, 1 - chloro - 2,4-epoxy-butane, 1-chloro-3,4 - epoxy - butane, 1 - chloro-4,5-epoxy-n-pentane, 2-chloro-5,6 - epoxy - n - hexane and 1-chloro-5,6-epoxy-n- hexane.

3. Process according to claim 1, wherein the amount, in parts by weight, of sulfur is 70 to 90, that of said polythiomethylene-alkanol resin is 15 to 1, the balance being said dithiophosphoric acid diester and vinylaryl hydrocarbon, the ponderal ratio of the diester to the vinyl-aryl hydrocarbon being 0.2 to 5.

4. Process according to claim 3, wherein said polythiomethylenealkanol resin results from the condensation of 1.5 to 2 moles of 1 - chloro - 2,3 - epoxy-propane with 1 mole of sodium polysulfide and at least 1 mole of hydrogen sulfide, said dithiophosphoric acid diester is diphenyldithiophosphate and the vinyl-aryl hydrocarbon is styrene.

5. Process according to claim 4, wherein each of the three compounds is separately added to the sulfur, and its adding is followed by a heating of 0.5 to 2 hours at a temperature of about 135° to 160° C.

6. Plastic nonflammable composition comprising a fused mass of 30 to 97 parts by weight of sulfur, 20 to 1 part of a dithiophosphoric acid diester containing aryl radicals each having 6 to 10 carbon atoms, 30 to 1 part of a vinylaryl hydrocarbon having 8 to 12 carbon atoms, and 20 to 1 parts of a polythiomethylene-alkanol resin resulting from the condensation of 1.5 to 2 moles of a halo-epoxyalkane having 3 to 6 carbon atoms with 1 mole of alkali metal polysulfide and at least 1 mole of hydrogen sulfide, the addition of the three adjuvants to the sulfur being stepwise wherein up to two of the three adjuvants are added simultaneously to the sulfur while excluding the simultaneous addition of polythiomethylene alkanol and dithiophosphoric diester.

7. Plastic nonflammable composition comprising a fused mass of 70 to 90 parts by weight of sulfur, 15 to 1 parts by weight of polythioalkanol resin resulting from the condensation of 1.5 to 2 moles of 1-chloro-2,3-epoxypropane with 1 mole sodium polysulfide and at least 1 mole H₂S, the balance being diphenyl-dithiophosphate and styrene, the ratio of the weight of diphenyl-dithiophosphate to that of styrene being 0.5 to 2, the addition of the three adjuvants to the sulfur being stepwise wherein up to two of the three adjuvants are added simultaneously to the sulfur while excluding the simultaneous addition of polythiomethylene alkanol and dithiophosphoric diester.

References Cited

UNITED STATES PATENTS

| | | | |
|---|---|---|---|
| 3,352,837 | 11/1967 | Signouret | 260—79 |
| 3,371,072 | 2/1968 | Signouret et al. | 260—79 |
| 3,384,609 | 5/1968 | Signouret et al. | 260—37 |
| 3,459,717 | 8/1968 | Signouret | 260—79 |
| 3,465,064 | 9/1969 | Signouret | 260—878 |

HOSEA E. TAYLOR, Primary Examiner

M. I. MARQUIS, Assistant Examiner

U.S. Cl. X.R.

106—287; 260—37, 41, 45.7, 79.1